US012620729B2

(12) United States Patent
Smith

(10) Patent No.: US 12,620,729 B2
(45) Date of Patent: May 5, 2026

(54) REVERSIBLE SPLICE CONNECTOR

(71) Applicant: Nathan Smith, Kenai, AK (US)

(72) Inventor: Nathan Smith, Kenai, AK (US)

( * ) Notice: Subject to any disclaimer, the term of this patent is extended or adjusted under 35 U.S.C. 154(b) by 356 days.

(21) Appl. No.: 18/437,353

(22) Filed: Feb. 9, 2024

(65) Prior Publication Data

US 2025/0260184 A1 Aug. 14, 2025

(51) Int. Cl.
*H01R 11/09* (2006.01)
*H01R 4/44* (2006.01)

(52) U.S. Cl.
CPC ............... *H01R 11/09* (2013.01); *H01R 4/44* (2013.01)

(58) Field of Classification Search
None
See application file for complete search history.

(56) References Cited

FOREIGN PATENT DOCUMENTS

| | | | | |
|---|---|---|---|---|
| CN | 112018530 A | * 12/2020 | ........... | H01R 43/027 |
| CN | 113782997 A | * 12/2021 | ............. | H01R 11/01 |

* cited by examiner

*Primary Examiner* — Tho D Ta

(57) ABSTRACT

A reversible splice connector mechanically and electrically couples a pair of electrical cables, where at least one of the electrical cables has a crimped-on electrical cable terminal with a threaded opening at the distal end of the terminal. The reversible splice connector comprises a metallic tube with at least one fastener opening that aligns with the threaded opening of the terminal and at least one threaded fastener. The splice is installable and reversible without removing the crimped-on electrical cable terminal.

20 Claims, 9 Drawing Sheets

PRIOR ART CABLE TERMINALS

PRIOR ART LOADBREAK ELBOW

PRIOR ART LONG SPLICE

REVERSIBLE SPLICE CONNECTOR

BACKGROUND

Various devices have been developed for the purpose of making electrical connections with regard to medium and high voltage applications (15-25 kV, for example). For instance, devices and equipment have been developed to help make electrical power distribution to residential neighborhoods and commercial facilities safer, more economical, and more reliable.

In such medium and high voltage electrical power systems, multiple electrical distribution cables are regularly run substantial distances (often underground) and are terminated at various locations at dedicated cabinets and equipment. Terminations at the cabinets and equipment can be made safer, more economical, and more reliable with the use of specialized cable connectors, such as loadbreak apparatus connectors, including loadbreak elbows. Loadbreak elbows are adapted to fit over the end of a prepared electrical distribution cable to allow the cable to be coupled to a distribution cabinet or like equipment with optimal electrical connectivity and reliability while maintaining maximum protection for operators and technicians. Preparing the cable includes crimping a specialized terminal to the end of the cable that has a threaded opening for accepting a loadbreak probe. The loadbreak probe extends from the cable terminal at a 90 degree angle, and all components are covered by an insulating “elbow-shaped” jacket.

Loadbreak elbows are designed so that the operators and technicians can efficiently engage and disengage cables with terminals at electrical distribution cabinets and equipment as needed. Cables can be moved from connection to connection within the cabinets easily to assemble and modify the distribution network according to electrical power requirements.

However, in the case of a change in the distribution network, an update to on-site equipment, or other change to electrical power needs, one or more cables previously prepared with loadbreak elbows (or like connectors) may need to be spliced to other cables, either temporarily or relatively long-term, to lengthen the cables (to provide requisite slack, for example). In these situations, the loadbreak probes and elbows are removed from the cable ends, and the specialized crimped-on terminals are cut from the cable to prepare the cable for a splice connector. The specialized crimped-on terminals are then discarded or recycled as scrap, since they can no longer be used. Cutting off the old terminal for splicing is inconvenient and wasteful. Worse, if the old cable has recently been through a cable rejuvenation injection process, cutting off the new, specialized connector is problematic.

Further, if the cable is to be returned to duty at the shorter length in the future, for example, the installed splice connector would then need to be cut from the cable, and the cable prepared again with a new specialized crimped-on terminal and loadbreak elbow. Of course, due to cutting the cable each time, each change to the cable results in a shorter run of cable and additional scrap.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

Figure 1A:
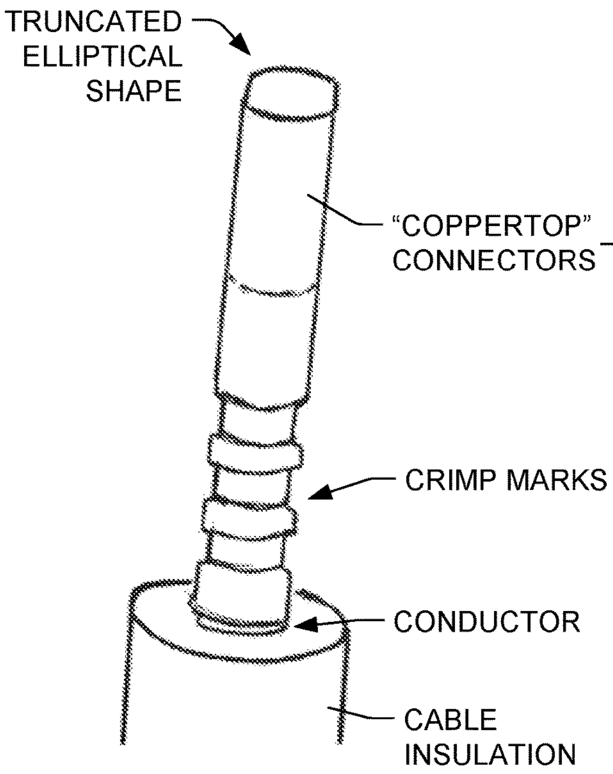
FIG. 1A is a prospective side view of an example electrical cable with a cable terminal installed.
Figure 1B:
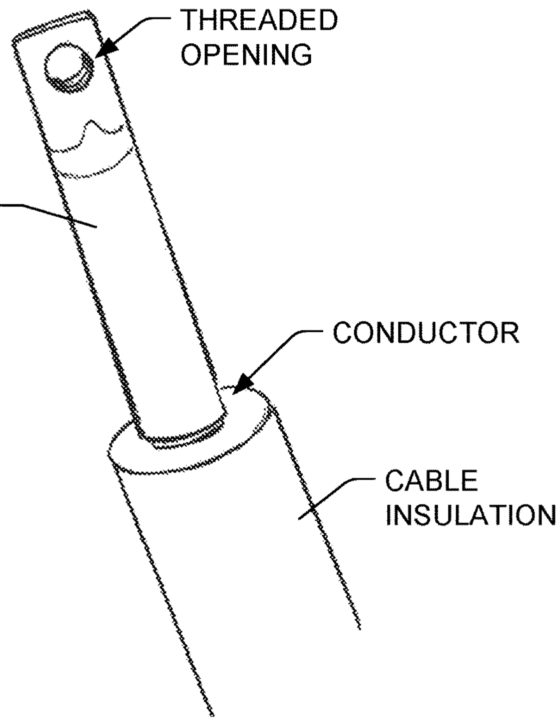
FIG. 1B is a prospective front view of an example electrical cable with a cable terminal installed.
Figure 2:
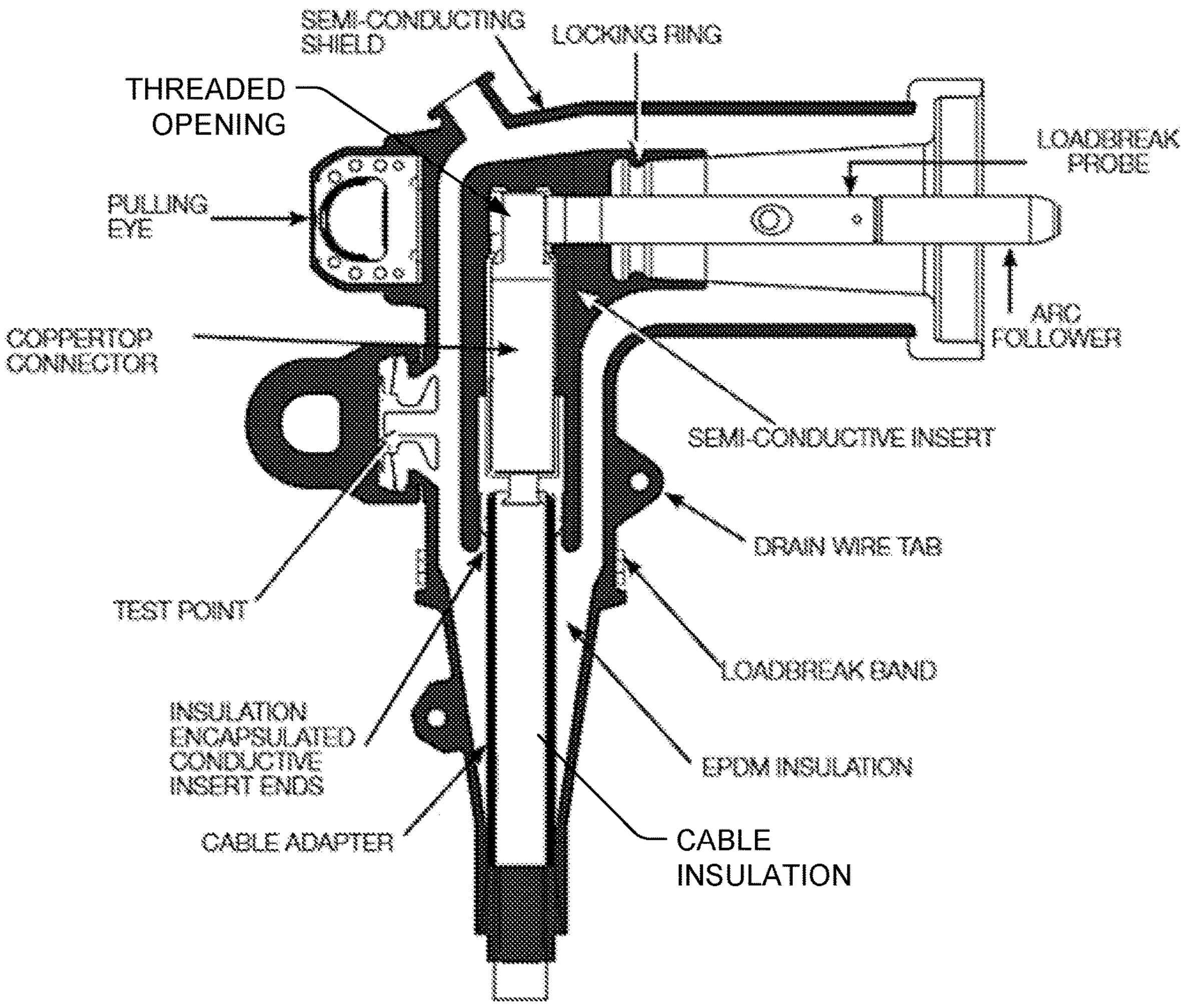
FIG. 2 shows a side view of an example loadbreak elbow.

Referring to FIGS. 1A, 1B, and 2, in many medium and high voltage electrical distribution networks, multiple electrical distribution cables are run various distances (often underground) and are terminated at dedicated cabinets and equipment. The cables may be terminated with specialized connectors for safety and reliability, as well as versatility. Loadbreak elbows (and like connectors) are often used in such applications. Loadbreak elbows are adapted to fit over the end of a prepared electrical distribution cable to allow the cable to be coupled to a distribution cabinet or like equipment with optimal electrical connectivity and reliability while maintaining maximum protection for operators and technicians.

As shown at FIGS. 1A and 1B, preparing the cable includes crimping a specialized terminal (often referred to as a “coppertop connector” or simply “coppertop”) to the end of the cable. The insulation layers are removed from the end of the cable and the metal conductor or conductors (e.g., conductor strands) of the cable are inserted into a hollow opening within the coppertop. The coppertop is then crimped to the metal conductor of the cable using a specialized crimping tool. Crimping the coppertop to the metal conductors of the cable ensures a reliable electrical connection as well as a permanent mechanical attachment between the coppertop and the metal conductors.

These specialized cable terminals are referred to as "coppertops" because the distal end of each terminal is comprised of solid copper, a copper alloy, or a copper layer, while the remainder of the terminal may be comprised of aluminum or an aluminum alloy. As shown at FIGS. 1A and 1B, the distal end of the coppertop includes a threaded opening through the end of the terminal. Note that while "coppertop connectors" are discussed herein, that is not intended to be limiting. The disclosure is intended to include other terminals comprised of various conductive materials and having a threaded opening or other connectivity feature (s) at a location of the terminals.

As also shown at FIGS. 1A and 1B, the cross-section of the coppertop (or other terminal) may have a specific shape at the distal end of the terminal. In one example, as shown, the cross-sectional shape of the coppertop is a truncated ellipse. The truncated ellipse may include two parallel flat surfaces, at opposite sides of the coppertop. For instance, the threaded opening of the coppertop may run through and perpendicular to one or more (e.g., both) flat surfaces of the truncated ellipse. The specific shape (e.g., truncated ellipse) at the distal end of the coppertop may extend from the distal end and partly or fully along a length of the coppertop. In other examples, the cross-sectional shape of the coppertop is a different shape (e.g., a polygon, an ellipse, an irregular shape, etc.). In the other examples, the threaded opening (or connective features) of the coppertop runs through the distal end of the coppertop as well.

Referring to FIG. 2, a loadbreak elbow can be fitted over the prepared cable end, with the coppertop positioned within the elbow such that the threaded opening is arranged to accept a loadbreak probe. The loadbreak probe is screwed into the threaded opening, and extends from the coppertop at a 90 degree angle. When the loadbreak elbow is fully assembled, it is ready to be used to couple the cable to a mating connector at an electrical distribution cabinet or other suitable equipment.

Figure 3:
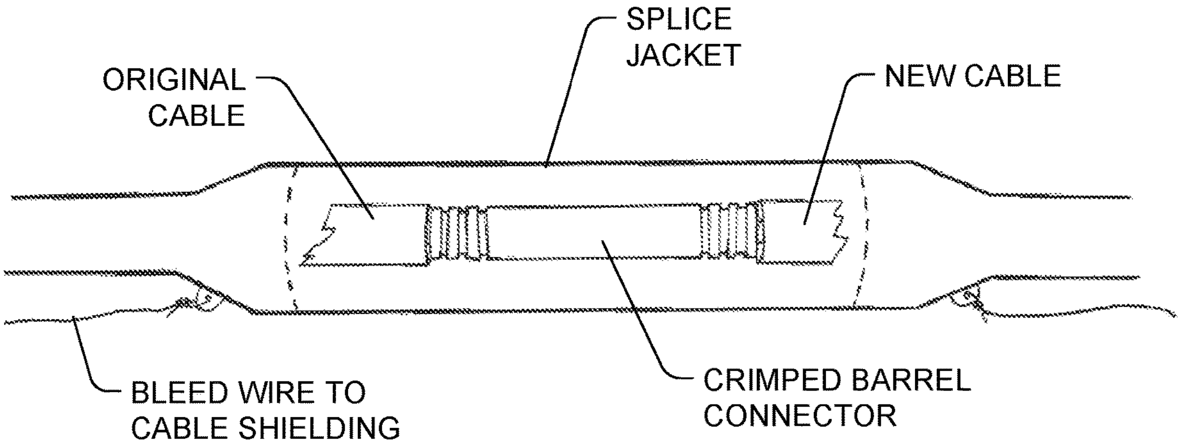
FIG. 3 is a side view of an example long splice, having a crimped barrel connector.

If the situation arises where the prepared cable needs to be lengthened, the loadbreak probe and the elbow are removed, and the coppertop connector is cut from the cable. Since the coppertop was permanently crimped to the metal conductors of the cable, the coppertop must be cut from the cable to remove it, and the coppertop connector is no longer usable. The cut end of the original cable is prepared, including removing a length of the cable insulation. Referring to FIG. 3, the prepared end of the original cable is inserted into one end of a barrel connector (e.g., crimp splice device) and the barrel connector is permanently crimped into place on the cable. One end of a second cable is also prepared and inserted into the other end of the barrel connector and the barrel connector is permanently crimped into place on the second cable end to extend the length of the overall cable. An insulated splice jacket can be installed over the crimped barrel connector to protect and to insulate the spliced portion of the cables.

If it becomes desirable to shorten the cable to its original length, the splice jacket is removed from the splice location and the crimped barrel connector is cut from the original cable. The crimped barrel connector is no longer usable and is discarded or recycled as scrap. The cut end of the original cable is prepared, including removing insulation to expose the metal conductor(s) of the cable. A new coppertop connector is placed over the exposed metal conductor(s) and permanently crimped into place. A loadbreak elbow can then be fitted over the prepared cable end and a loadbreak probe threaded into the coppertop. As mentioned above, each time the cable is cut the length of the cable is shortened and scrap is generated.

Representative implementations of devices and techniques disclosed herein provide a reversible splice connector that reduces installation time, reduces waste, and can maintain the cable length. In various embodiments, including those illustrated herein, the reversible splice connector allows a cable to be lengthened without cutting the coppertop connector from the end of the cable. The techniques and devices provide a removable and replaceable splice without cutting the cable or damaging the cable terminations or the connector. The reversible splice connector allows the use of the existing cable terminal (e.g., coppertop) for multiple applications and arrangements. Further, it allows the splice to be reversed—that is it allows the cable to be returned to its original length without cutting the cable or generating scrap.

The disclosed reversible splice connector provides the ability to couple a pair of cables together using the crimped-on coppertop connector (or like terminal) attached to the cable. The reversible splice connector couples directly to the coppertop that is crimped to the cable end, and while a reliable electrical and mechanical bond is formed, it can be reversed when desired without cutting or damaging any of the parts, so that the splice can be taken apart and an elbow quickly installed in its place. The reversible splice connector can also couple to a second cable having a coppertop (or like terminal) crimped to an end of the second cable. With these devices and techniques, new construction could, if desired, incorporate the disclosed reversible splices rather than elbows in currently vacant locations that might not be utilized for some time. Other temporary uses of reversible splices are contemplated that would be useful for easily swapping between the splice and elbows or other connection types.

The disclosed devices and techniques are illustrated in the context of medium and high voltage electrical cables, but this is not intended to be limiting. The devices and techniques disclosed herein can also be applied to other cables, conductors, wires, and the like, and remain within the scope of the disclosure. Coppertop cable terminals are discussed for illustrative purposes, and other cable and wire terminals are also within the scope of this disclosure.

Example Reversible Splice Connector

As shown at FIGS. 4A-6, in various embodiments, a reversible splice connector 400 is disclosed. The reversible splice connector 400 is configured to splice a cable having a coppertop 410 (or like connector) crimped to the end of the cable to a second cable (which also can have a coppertop 410 or like connector crimped to its end. The reversible splice connector 400 forms a reliable electrical and mechanical bond to each of the pair of cables (forming a reliable splice that joins the pair of cables) and is reversible when desired. In other words, the reversible splice connector 400 can be removed from the coppertop 410 at the end of a cable without removing the coppertop 410 or cutting or otherwise damaging the cable or the coppertop 410. The coppertop 410 remains crimped to the end of the cable for further duty with a loadbreak elbow or other connector.

Figure 4A:
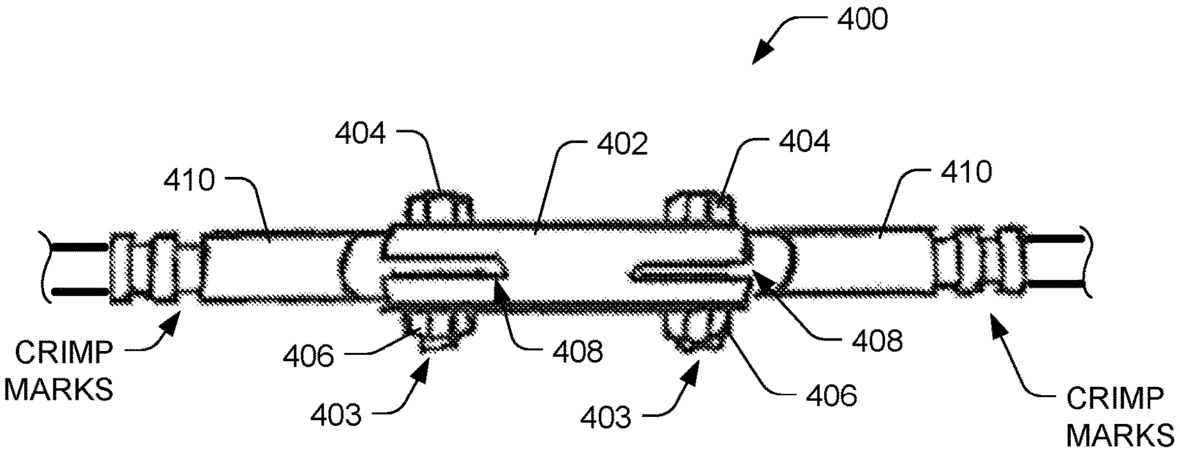
FIG. 4A shows a side view of an example reversible splice connector installed on a pair of cable terminals, according to an embodiment.
Figure 4B:
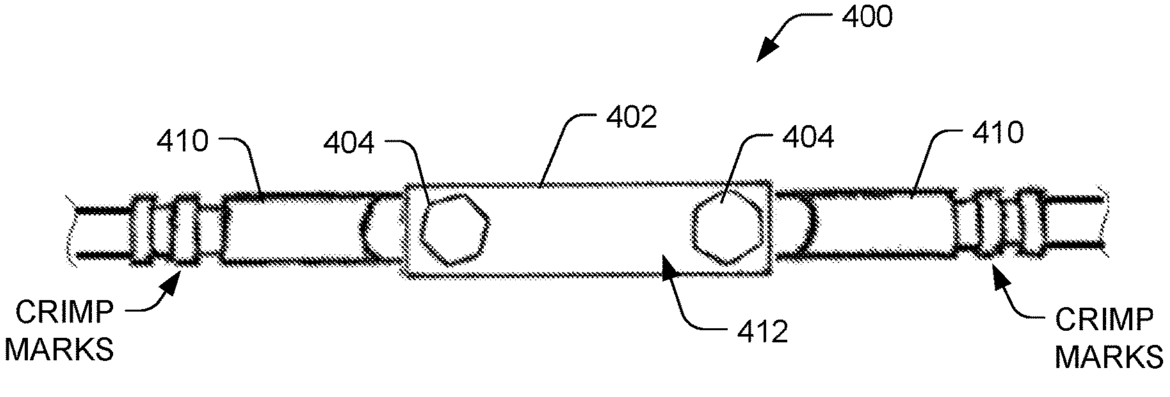
FIG. 4B shows a front view of an example reversible splice connector installed on a pair of cable terminals, according to an embodiment.
Figure 5A:
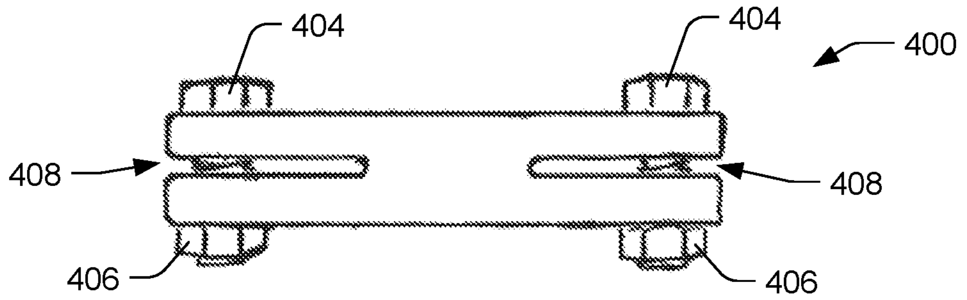
FIG. 5A shows a side view of an example reversible splice connector, according to an embodiment.
Figure 5B:
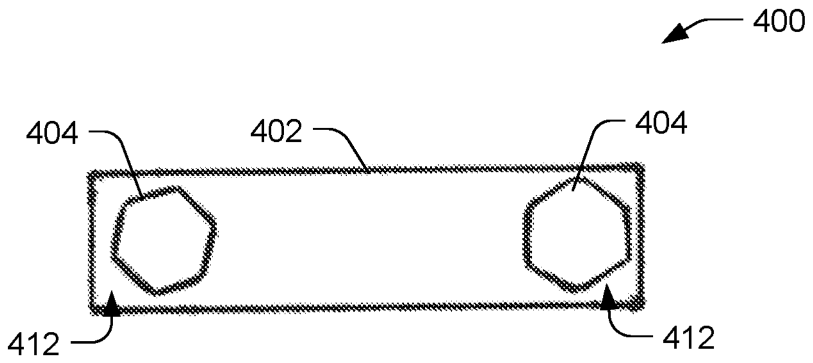
FIG. 5B shows a front view of an example reversible splice connector, according to an embodiment.
Figure 5C:
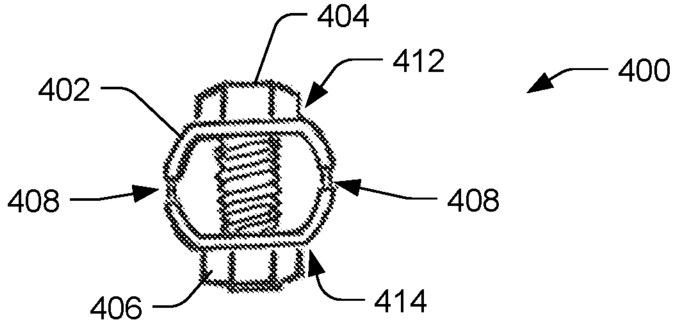
FIG. 5C shows an end view of an example reversible splice connector, according to an embodiment.
Figure 6:
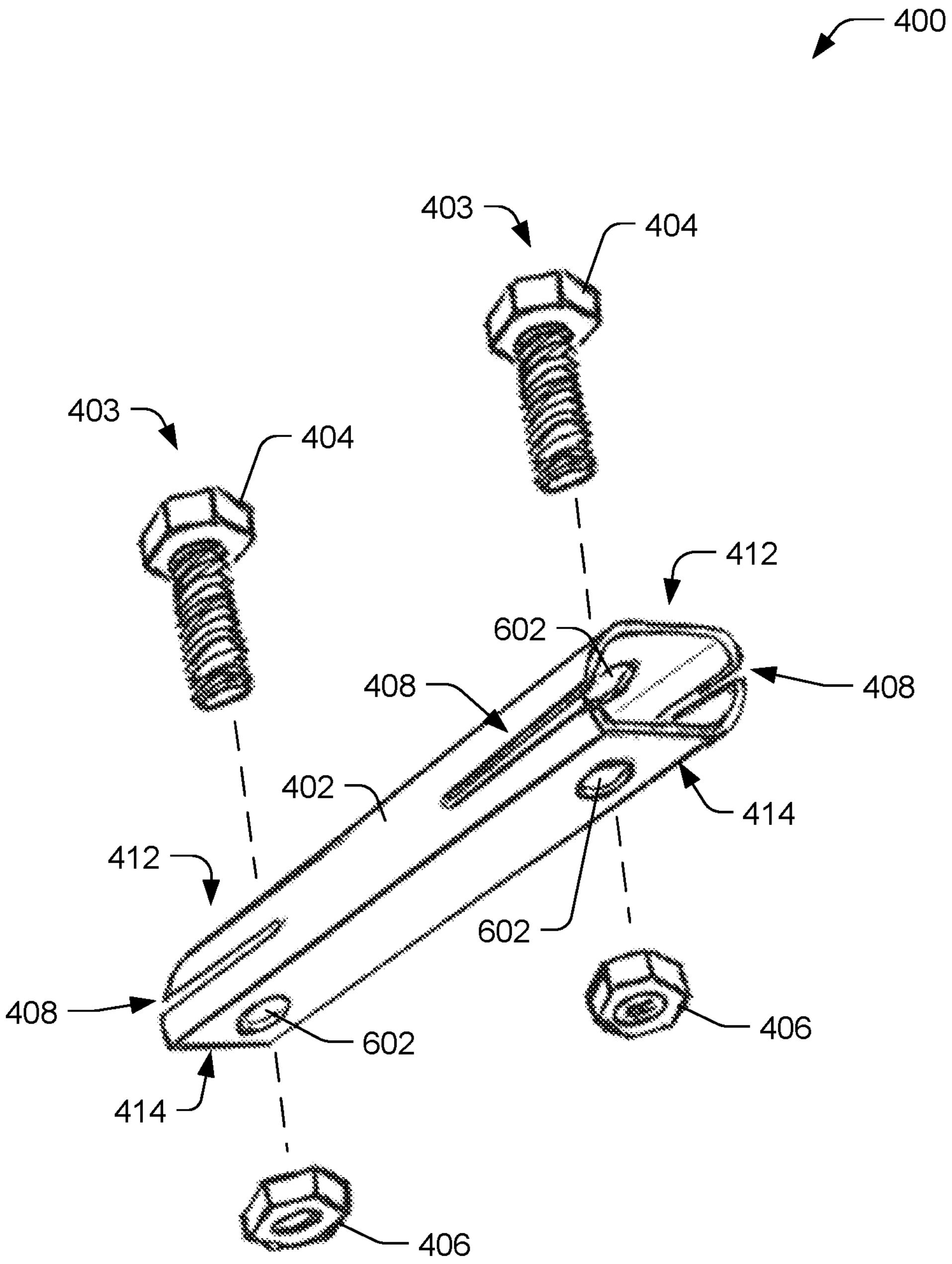
FIG. 6 shows an exploded view of the example reversible splice connector of FIG. 5A, according to the embodiment.

FIGS. 4A and 4B show a reversible splice connector 400 coupled to a pair of coppertop 410 connectors (which are assumed to be crimped to a pair of cables, respectively). FIG. 4A shows a side view and FIG. 4B shows a front view of the reversible splice connector 400 coupled to the connectors 410. In various embodiments, the reversible splice connector 400 includes a splice body 402, and a pair of fasteners 403 (for example a pair of bolts 404 and associated nuts 406). In alternate embodiments, the fasteners 403 may comprise other types of fasteners. FIG. 5A shows the reversible splice connector 400 in side view, FIG. 5B shows the reversible splice connector 400 in front view, and FIG. 5C shows the reversible splice connector 400 in end view, according to an embodiment. FIG. 6 shows an exploded view of the reversible splice connector 400, according to the embodiment.

In the embodiments, the splice body 402 comprises a tube-like component comprised of a conductive material such as copper, a copper alloy, a copper-aluminum alloy, an aluminum alloy, aluminum, or other conductive metal or metal alloy. The pair of fasteners 403 can also be comprised of one or more of the above materials, and may be comprised of the same material as the splice body 402. The splice body 402 can comprise a tube or a length of material that has been formed/folded/bent into a tube-shape with a hollow interior cavity or at least two hollow ends. As shown at FIGS. 5C and 6, at least the hollow ends of the tube can have a cross-sectional shape to match the cross-sectional shape of the coppertop 410, so that the coppertop 410 fits snugly within the interior of the ends of the splice body 402. For example, the splice body 402 can also have a cross-sectional shape of a truncated ellipse, at least at the ends of the splice body 402 where the coppertop 410 is inserted. The truncated ellipse may include two parallel flat surfaces, 412 and 414, at opposite sides/surfaces of the splice body 402. A flat surface 412 can be disposed at the front surface, as shown at FIGS. 4B, 5C, and 6. An additional flat surface 414 can be disposed at the back surface (opposite the front surface), as also shown at FIGS. 4B, 5C, and 6. In alternate embodiments, the splice body 402 can have other cross-sectional shapes (e.g., polygonal, elliptical, irregular, etc.) to match other connectors, as desired. It is also within the scope of the disclosure for the splice body 402 to have ends having a different cross-sectional shape at each end.

In an alternate embodiment (not shown), the splice body 402 has one end that is intended to be crimped to a prepared cable end and another end with an opening configured to receive a coppertop 410. In the embodiment, the splice body 402 is intended to be permanently attached to one cable end and reversibly attached to another cable end (e.g., using a coppertop 410 (or other connector) at the other cable).

As shown in FIGS. 4A, 5A, 5C, and 6, the splice body 402 can have a slot 408 (e.g., slit, split, etc.) that extends longitudinally from an end of the splice body 402 a predetermined distance towards a center of the splice body 402. The splice body 402 can have one or more slots 408 at each end of the splice body 402. For example, as shown at FIGS. 4A, 5A, 5C, and 6, the splice body 402 can have a pair of slots 408 at each end. The slots 408 are disposed at the sides of the splice body 402, positioned 90 degrees from the flat surfaces 412 and 414, but may be disposed at different places on the splice body 402 in other examples. The slots 408 allow the top surface 412 and the bottom surface 414 to be compressed toward each other and against the coppertop 410 after inserting the coppertop 410 into the end of the splice body 402. The splice body 402 has a material thickness that is able to carry the electrical load intended to be carried on the cable (e.g., over 200 A, etc.). Further, the metal or alloy used to form the splice body 402 is annealed or otherwise made to be soft enough to facilitate the compression of the top surface 412 and the bottom surface 414 to the coppertop 410, without cracking or breaking the splice body 402.

As shown at FIG. 6, the splice body 402 can have a pair of fastener openings 602 at each end of the splice body 402. For instance the fastener openings 602 can be disposed at the flat surfaces 412 and 414, at the ends of the splice body 402. The fastener openings 602 are disposed 90 degrees from the slots 408 to allow the top surface 412 and the bottom surface 414 to be compressed toward each other and against the coppertop 410. The fastener openings 602 are arranged to receive the fasteners 403 for securing the coppertop 410 within the splice body 402 and for compressing the top 412 and bottom 414 surfaces to the coppertop 410. As described above, a coppertop 410 (crimped to a cable) is inserted into an open end of the splice body 402, with the flat surfaces of the coppertop 410 aligned to the flat surfaces 412 and 414 of the splice body 402. The threaded opening of the coppertop 410 is aligned to the fastener openings 602 in the flat surfaces 412 and 414 of the splice body 402. The fasteners 403 are inserted into and through the fastener openings 602 to secure the splice body 402 to the coppertop 410. The length of the top surface 412 and the bottom surface 414 (e.g., extending beyond the fastener openings 602) can be made to a size that provides a desired bearing surface against the coppertop 410.

For example, as shown at FIGS. 4A-6, the bolt 404 is inserted through the fastener opening 602 in the top flat surface 412 and is threaded into the threaded opening of the coppertop 410. The bolt 404 is sized and threaded to fit the threaded opening of the coppertop 410 (or other connector being used). In some examples, one or more of the fastener openings 602 are also threaded to receive the bolt 404. The bolt 404 then protrudes through the fastener opening 602 in the bottom flat surface 414. The nut 406 is tightened onto the protruding end of the bolt 404, which compresses the flat surfaces 412 and 414 of the splice body 402 onto the flat portions of the coppertop 410. This creates a secure and reliable mechanical bond between the splice body 402 and the coppertop 410, forming one mechanically rigid unit, as well as forming a reliable electrical connection. This is repeated for the second cable and second end of the splice body 402.

Figure 7:
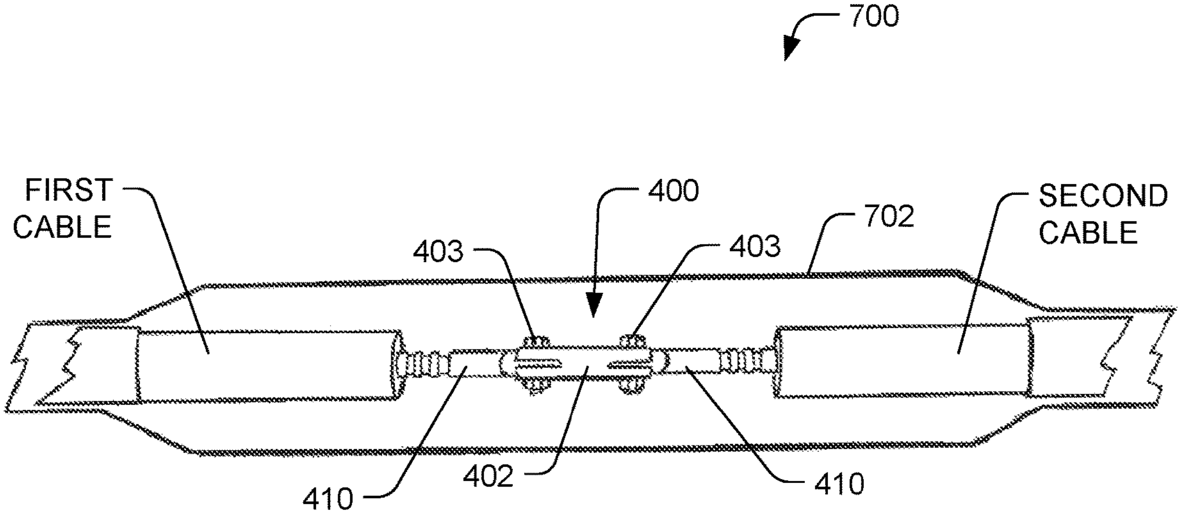
FIG. 7 shows a side view of an example reversible long splice, according to an embodiment.

Referring to FIG. 7, the installed reversible splice connector 400 can be covered (e.g., encased, enclosed, etc.) with a durable splice jacket 702 to protect the splice from the environment. The splice jacket 702 may be sealed to the first and second cables and/or to one or more components of the reversible splice connector 400. In this configuration, the combination (e.g., a reversible splice connector 400 with a splice jacket 702, and optionally one or two coppertop 410 connectors) comprises a reversible long splice 700. In various embodiments, the splice jacket 702 can be comprised of one or more polymers, natural or artificial rubber, composites, and the like. The splice jacket 702 can be made waterproof and resistant to deformation. The reversible long splice 700 can be reversed by removing the splice jacket 702 and removing the fasteners 403 and the splice body 402 from the coppertops 410. The first and second cables still include the crimped on coppertops 410, so they are prepared to be used with loadbreak elbows (or other connections) if desired.

The first and second cables can comprise "concentric neutral" or "CN" electrical distribution cables (or the like). For example, CN cables have several concentric layers, including: a braided metal neutral conductor surrounding a semi-conductive shield, disposed over a layer of electrical insulation, which surrounds the metal conductor(s) of the cable. During preparation of the cable end, the braided neutral is folded back to expose the semi-conductive shield. As part of the splice preparation, the semi-conductive shield can be bonded to the neutral conductor inside or outside of a splice jacket.

Figure 8A:
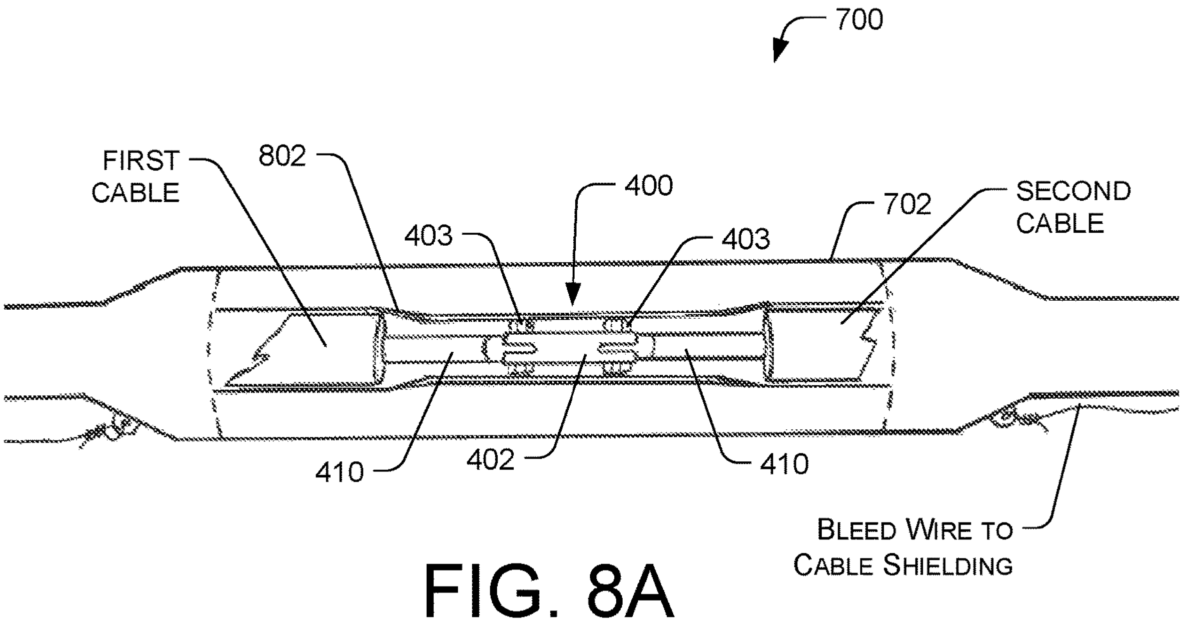
FIG. 8A shows a side view of an example reversible long splice, according to another embodiment.
Figure 8B:
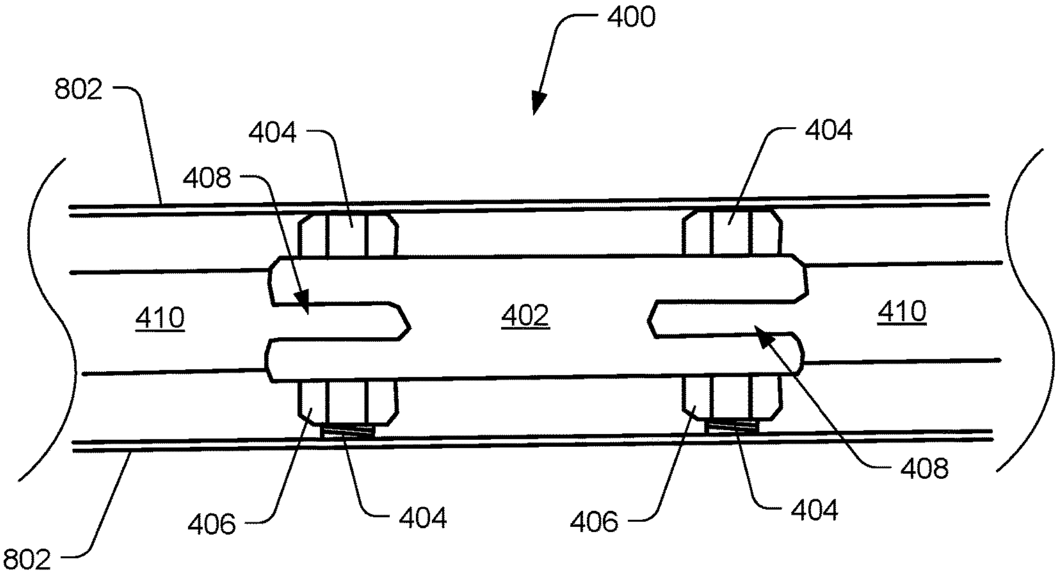
FIG. 8B shows a side detail view of an example reversible splice connector, according to the embodiment of FIG. 8A.

Referring to FIGS. 8A and 8B, in some embodiments of a reversible long splice 700, when the reversible splice connector 400 is covered (e.g., encased, enclosed, etc.) with a splice jacket 702, the reversible splice connector 400 is also surrounded by a semi-conductive layer 802. As shown at FIG. 8A, the semi-conductive layer 802 surrounds and makes contact with the reversible splice connector 400 that couples the first and second cables. In the embodiments, the fasteners 403 of the reversible splice connector 400 make physical (and electrical) contact with the semi-conductive layer 802.

Referring to FIG. 8B, in the example, the bolts 404 and/or the nuts 406 make contact with the semi-conductive layer 802. For example, electrical contact is made at least between the heads of the bolts 404 and the semi-conductive layer 802 on the inside of the splice jacket 702. In other examples, the opposite ends of the bolts 404 can make electrical contact with the semi-conductive layer 802 and/or the nuts 406 can make electrical contact with the semi-conductive layer 802.

Figure 9A:
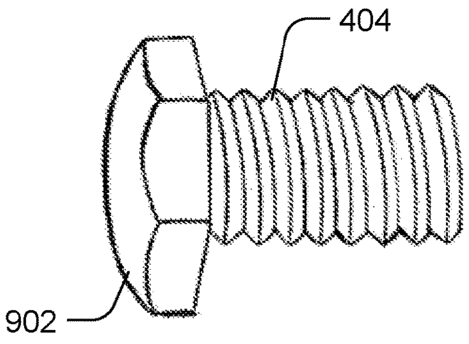
FIGS. 9A-9D show example fastener components for an example reversible splice connector, according to various embodiments.
Figure 9B:
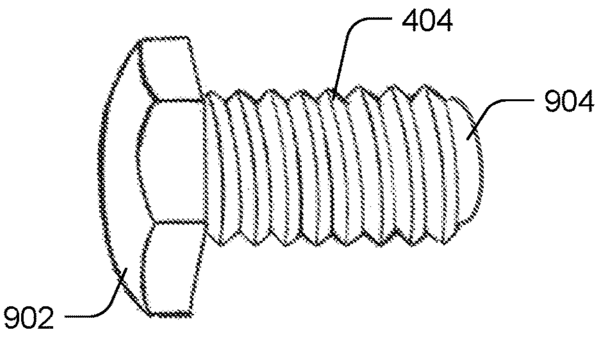
Figure 9C:
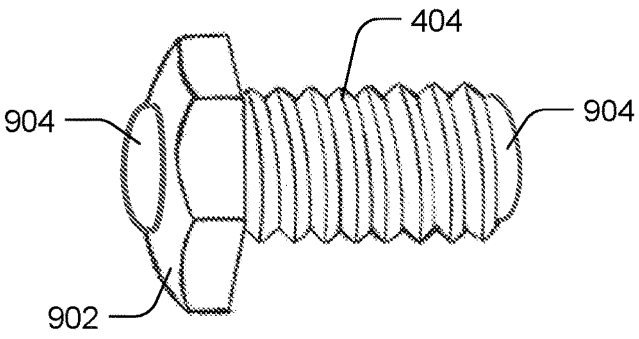
Figure 9D:
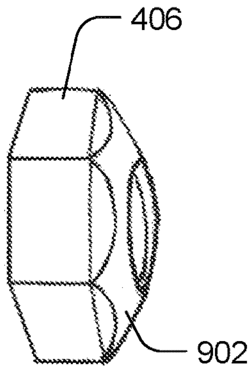

Referring to FIGS. 9A-9D, various examples of bolts 404 and a nut 406 are illustrated. As shown, in various embodiments, the corners 902 of the heads of the bolts 404 and the nuts 406 are slightly chamfered (or rounded) to prevent stress spots on the interior of the splice jacket 702 body or the semi-conductive layer 802. The chamfered corners 902 can also provide a more reliable electrical connection between the heads of the bolts 404 or the nuts 406 and the semi-conductive layer 802. In some examples, other features 904 such as raised electrical contact patches can be included on one or both ends of the fasteners 403 (e.g., bolts 404) to aid in making reliable electrical connections with the semi-conductive layer 802. A bolt without features 904 is shown at FIG. 9A. As shown at FIG. 9B, the end of the bolt 404 can have features 904 such as a rounded end or an extended end configured to engage with the semi-conductive layer 802 and to add surface contact area. As shown at FIG. 9C, the head of the bolt 404 and/or the end of the bolt 404 can have features 904 such as a rounded end or an extended end configured to engage with the semi-conductive layer 802 and to add surface contact area. In other embodiments, other features 904 may also be employed.

The shape and size of the reversible splice connector 400 and related components as described and/or illustrated in the figures may vary to accommodate various applications. In alternate embodiments, fewer, additional, or alternate components may be used and/or combined, having an equivalent function and operation.

The illustrations of FIGS. 1-9D are not intended to be limiting. In the various example embodiments, the location and position of components, attachment mechanisms, and the like are for example only, unless specified otherwise. Other locations and positions are contemplated and are within the scope of this disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that a reversible splice connector 400 or a reversible long splice 700 may be implemented as a stand-alone device or as part of another system (e.g., integrated with other components). For example, the reversible splice connector 400 or reversible long splice 700 may be added to an existing arrangement or to existing equipment.

Various implementations and examples are discussed herein, and further implementations and examples may be possible by combining the features and elements of individual implementations and examples.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the disclosed techniques, systems, and devices. Further, individual features of various embodiments may be combined to form other embodiments not specifically described.

What is claimed is:

1. A reversible splice connector for electrical cables, comprising:

a splice body comprising a hollow metallic tube with first and second ends, the splice body having opposing flat surfaces at least at the first and second ends, each of the first and second ends configured to receive an electrical cable terminal having a threaded opening at a distal end of the electrical cable terminal;

first and second fastener openings disposed at the opposing flat surfaces of the first end;

first and second slots disposed at 90 degree offsets from the first and second fastener openings, the first and second slots extending longitudinally from the first end a predetermined distance toward a center of the splice body;

third and fourth fastener openings disposed at the opposing flat surfaces at the second end;

third and fourth slots disposed at 90 degree offsets from the third and fourth fastener openings, the third and fourth slots extending longitudinally from the second end a predetermined distance toward a center of the splice body;

a first bolt configured to pass through the first fastener opening, to thread through a threaded opening of a first electrical cable terminal, and to pass through the second fastener opening;

a second bolt configured to pass through the third fastener opening, to thread through a threaded opening of a second electrical cable terminal, and to pass through the fourth fastener opening;

a first nut configured to thread onto the first bolt and to compress the opposing flat surfaces of the first end onto the first electrical cable terminal; and a second nut configured to thread onto the second bolt and to compress the opposing flat surfaces of the second end onto the second electrical cable terminal.

2. The reversible splice connector of claim 1, further comprising a protective splice jacket configured to encase the splice body and to protect the splice body from an environment of the splice body.

3. The reversible splice connector of claim 2, further comprising a semi-conductive layer within the splice jacket that is at least partly surrounding the splice body, and wherein at least one of the first and second bolts and the first and second nuts is arranged to make contact with the semi-conductive layer.

4. The reversible splice connector of claim 1, wherein a cross-sectional shape of at least one of the first and second ends of the splice body comprises a truncated ellipse.

5. The reversible splice connector of claim 1, wherein at least one of the first and second bolts and the first and second nuts is comprised of an electrically conductive material.

6. The reversible splice connector of claim 1, wherein at least one of the first and second bolts and the first and second nuts has chamfered corners.

7. The reversible splice connector of claim 1, wherein at least one of the first and second bolts includes a raised electrical contact feature at a head of the bolt and/or an end of the bolt.

8. A reversible splice connector for electrical cables, comprising:

a splice body comprising a metallic tube with first and second ends, the splice body having opposing flat surfaces at least at the first end, the first end configured to receive an electrical cable terminal having a threaded opening at a distal end of the electrical cable terminal;

first and second fastener openings disposed at the opposing flat surfaces of the first end;

first and second slots disposed at 90 degree offsets from the first and second fastener openings, the first and second slots extending longitudinally from the first end a predetermined distance toward a center of the splice body;

a first fastener configured to pass through the first fastener opening, to thread through the threaded opening of the first electrical cable terminal, and to pass through the second fastener opening and to compress the opposing flat surfaces of the first end onto the first electrical cable terminal.

9. The reversible splice connector of claim 8, further comprising third and fourth fastener openings disposed at the opposing flat surfaces at the second end; and third and fourth slots through the splice body disposed at 90 degree offsets from the third and fourth fastener openings, the third and fourth slots extending longitudinally from the second end a predetermined distance toward a center of the splice body.

10. The reversible splice connector of claim 8, further comprising a crimp-type connection at the second end of the splice body, configured to receive an insulation-stripped electrical cable.

11. The reversible splice connector of claim 8, wherein at least at the first end of the splice body is hollow.

12. The reversible splice connector of claim 8, wherein the first fastener is comprised of a same material as the splice body.

13. The reversible splice connector of claim 8, wherein the electrical cable terminal comprises a medium or high voltage "coppertop" terminal.

14. A reversible splice connector for electrical cables, comprising:

a splice body comprising a conductive metallic tube with first and second hollow ends, each of the first and second ends configured to receive an electrical cable terminal having a threaded opening at a distal end of the electrical cable terminal;

first and second fastener openings disposed at opposing surfaces of the first end;

first and second slots disposed at 90 degree offsets from the first and second fastener openings, the first and second slots extending longitudinally from the first end a predetermined distance toward a center of the splice body;

third and fourth fastener openings disposed at the opposing surfaces at the second end;

third and fourth slots disposed at 90 degree offsets from the third and fourth fastener openings, the third and fourth slots extending longitudinally from the second end a predetermined distance toward a center of the splice body;

a first fastener configured to pass through the first fastener opening, to thread through a threaded opening of a first electrical cable terminal, and to pass through the second fastener opening and to compress the opposing surfaces of the first end onto the first electrical cable terminal; and a second fastener configured to pass through the third fastener opening, to thread through a threaded opening of a second electrical cable terminal, and to pass through the fourth fastener opening and to compress the opposing surfaces of the second end onto the second electrical cable terminal.

15. The reversible splice connector of claim 14, further comprising first and second electrical cable terminals configured to be inserted into the first and second ends, respectively, the first and second electrical cable terminals having a threaded opening at a distal end of the first and second electrical cable terminals.

16. The reversible splice connector of claim 15, wherein the threaded openings of the first and second electrical cable terminals are arranged to align to the first and second fastener openings and the third and fourth fastener openings, respectively, when the first and second electrical cable terminals are within the first and second hollow ends of the splice body.

17. The reversible splice connector of claim 14, further comprising a splice jacket configured to encase the splice body and to protect the splice body from the environment.

18. The reversible splice connector of claim 17, further comprising a semi-conductive layer within the splice jacket and at least partly surrounding the splice body, and wherein at least one of the first and second fasteners is arranged to make electrical contact with the semi-conductive layer.

19. The reversible splice connector of claim 14, wherein a cross-sectional shape of the first and second hollow ends is arranged to match a cross-sectional shape of a distal end of the electrical cable terminal.

20. The reversible splice connector of claim 14, wherein the opposing surfaces of the first end comprise parallel flat surfaces and the opposing surfaces at the second end comprise parallel flat surfaces.

* * * * *